(12) United States Patent
Wang et al.

(10) Patent No.: US 12,512,676 B2
(45) Date of Patent: Dec. 30, 2025

(54) MULTI-SOURCE COUPLING SYSTEM FOR HOUSEHOLD ENERGY STORAGE

(71) Applicant: FranklinWH Energy Storage Inc., San Jose, CA (US)

(72) Inventors: Tao Wang, Shenzhen (CN); Gang Xiao, Shenzhen (CN); Daqing Wang, Shenzhen (CN); Song Chen, Shenzhen (CN)

(73) Assignee: FranklinWH Energy Storage Inc., San Jose, CA (US)

( * ) Notice: Subject to any disclaimer, the term of this patent is extended or adjusted under 35 U.S.C. 154(b) by 0 days.

(21) Appl. No.: 18/350,920

(22) Filed: Jul. 12, 2023

(65) Prior Publication Data

US 2024/0006888 A1    Jan. 4, 2024

Related U.S. Application Data

(63) Continuation of application No. PCT/CN2023/085404, filed on Mar. 31, 2023.

(30) Foreign Application Priority Data

Jun. 29, 2022   (CN) .......................... 202221705010.1

(51) Int. Cl.
   *H02J 3/38*   (2006.01)
   *H02J 3/00*   (2006.01)

(52) U.S. Cl.
   CPC ................. *H02J 3/38* (2013.01); *H02J 3/007* (2020.01); *H02J 2300/24* (2020.01); *H02J 2310/12* (2020.01)

(58) Field of Classification Search
   CPC .......... H02J 3/38; H02J 3/007; H02J 2300/24; H02J 2310/12; H02J 2300/30; H02J 3/32; H02J 3/322; H02J 3/381; H02J 7/35
   See application file for complete search history.

(56) References Cited

U.S. PATENT DOCUMENTS

2018/0037121 A1 *  2/2018  Narla .................... H02J 3/38
2021/0325922 A1 * 10/2021  Zimmanck .............. H02M 7/44

FOREIGN PATENT DOCUMENTS

WO    WO-2023068919 A1 *  4/2023  ................ H02J 3/14

* cited by examiner

*Primary Examiner* — Daniel Cavallari
(74) *Attorney, Agent, or Firm* — ANOVA LAW GROUP, PLLC

(57) ABSTRACT

A multi-source coupling system for household energy storage includes an energy gateway configured to control coupling and decoupling of different power sources; an energy storage system coupled to the energy gateway and configured to store electrical energy; and a power conversion system coupled to the energy gateway and configured to convert the different power sources into current sources or voltage sources.

20 Claims, 3 Drawing Sheets

MULTI-SOURCE COUPLING SYSTEM FOR HOUSEHOLD ENERGY STORAGE

CROSS-REFERENCE TO RELATED APPLICATION(S)

This application is a continuation application of International Patent Application No. PCT/CN2023/085404, filed on Mar. 31, 2023, which claims priority to Chinese Patent Application No. 202221705010.1 filed on Jun. 29, 2022, the disclosures of all of which are incorporated herein by reference in their entireties.

TECHNICAL FIELD

The present application relates to the technical field of household energy storage and, for example, a multi-source coupling system for household energy storage.

BACKGROUND

A microgrid is a small power generation and distribution system that is composed of distributed power sources, energy storage devices, energy conversion devices, related loads, and protection devices. The home microgrid in the related art may only be coupled to the photovoltaic power source and grid at the same time. When a device such as a generator or another power supply device without a phase-locking function is coupled to an energy storage system, the device cannot work properly or is even damaged due to phase desynchronization. In addition, a direct current power source cannot be connected in parallel with alternating current power source, limiting the use scenarios of the home microgrid, which is not conducive to the household energy storage effect.

SUMMARY

The present application provides a multi-source coupling system for household energy storage to improve the effect of using a household energy storage system.

The present application provides a multi-source coupling system for household energy storage. The multi-source coupling system for household energy storage includes an energy gateway, an energy storage system, and a power conversion system. The energy gateway is configured to control the coupling and decoupling of different power sources. The energy storage system is coupled to the energy gateway and configured to store electrical energy. The power conversion system is coupled to the energy gateway and configured to convert the different power sources into current sources or voltage sources.

The energy storage system includes at least one energy storage module configured to store the electrical energy.

The energy storage system includes multiple energy storage modules and further includes a combiner box, and the combiner box is configured to combine the electric energy of the multiple energy storage modules.

The power conversion system includes multiple power conversion modules, where each power conversion module of the multiple power conversion modules is configured to be coupled to one power source of the different power sources.

Any power conversion module of the multiple power conversion modules is a direct current-alternating current (DC-AC) conversion module or an alternating current-alternating current (AC-AC) conversion module.

The multiple power conversion modules have a phase-locking function.

The energy gateway includes a first switch, a second switch, and a third switch, where the first switch is coupled to the second switch, the third switch is coupled between the first switch and the second switch, the first switch is configured to be coupled to the power conversion system and a photovoltaic power source, the second switch is configured to be coupled to the power conversion system and a load, and the third switch is configured to be coupled to the energy storage system.

The energy gateway further includes a fourth switch coupled between the first switch and the second switch and configured to be coupled to the power conversion system and a generator.

The energy gateway further includes a fifth switch coupled between the first switch and the second switch and configured to be coupled to the power conversion system and a car power outlet.

The energy gateway further includes a sixth switch coupled between the first switch and the second switch and configured to be coupled to the power conversion system and a fuel cell.

BRIEF DESCRIPTION OF DRAWINGS

Drawings used in the description of embodiments of the present application are briefly described below.

DETAILED DESCRIPTION

The present application is described in conjunction with the drawings and embodiments. It is to be understood that the embodiments described herein are intended to explain and not to limit the present application.

The implementation of the present application is described below in conjunction with the drawings.

Figure 1:
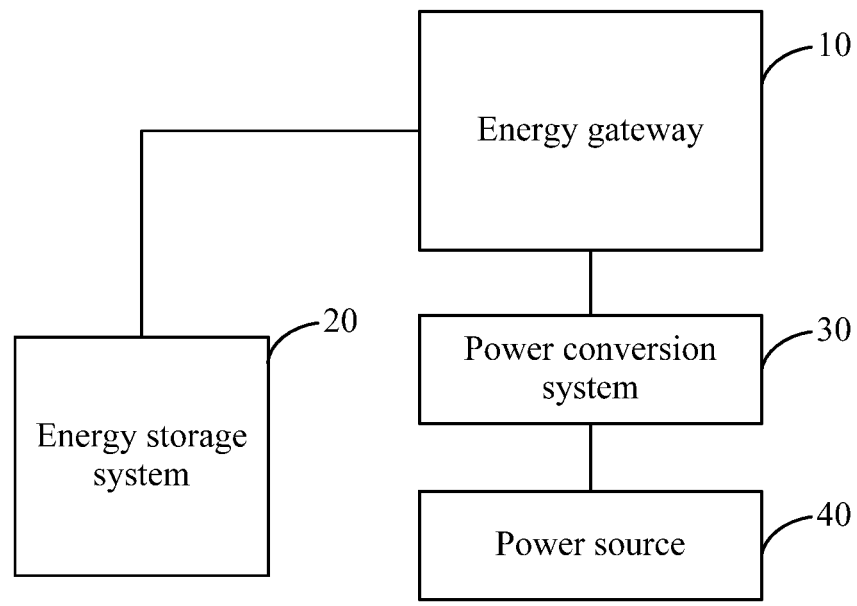
FIG. 1 is a schematic diagram of a multi-source coupling system for household energy storage in an embodiment of the present application.

Embodiments of the present application provide a multi-source coupling system for household energy storage. As shown in FIG. 1, the multi-source coupling system for household energy storage includes an energy gateway 10, an energy storage system 20, and a power conversion system 30. The energy gateway 10 is configured to control the coupling and decoupling of different power sources 40. The energy storage system 20 is coupled to the energy gateway 10 and configured to store electrical energy. The power conversion system 30 is coupled to the energy gateway 10 and configured to convert the different power sources 40 into current sources or voltage sources.

The multi-source coupling system for household energy storage is applied to a household energy storage system, and multiple power sources 40 are coupled to the household energy storage system to store energy for the household energy storage system.

The energy gateway 10 is configured to control the coupling and decoupling of the different power sources 40. When the power sources 40 are coupled, the power sources 40 can store the electrical energy for the energy storage system 20.

The energy storage system 20 is configured to store the electrical energy. When a main power source is disconnected from the household energy storage system, the household energy storage system supplies power through the energy storage system 20.

The power conversion system 30 is coupled to the energy gateway 10, and the different power sources 40 are coupled to the energy gateway 10 through the power conversion system 30. The power conversion system 30 is configured to convert the power sources 40 into current sources or voltage sources to match the working modes of the household energy storage system.

As an optional embodiment, the power conversion system 30 is configured to switch the power sources 40 between DC and AC or transform an AC power source to work better for the energy storage system 20.

Figure 5:
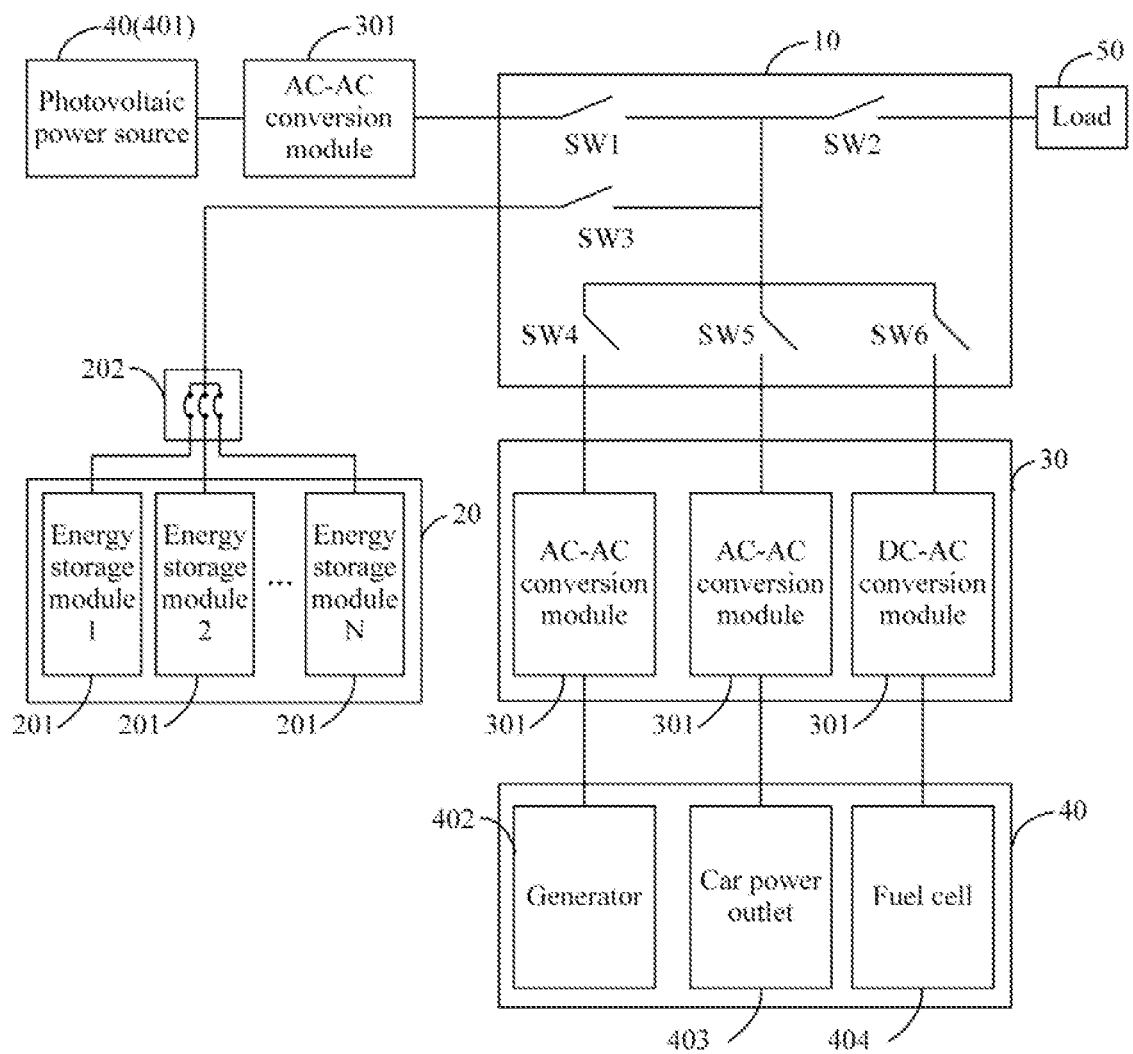
FIG. 5 is a schematic diagram of a multi-source coupling system for household energy storage in another embodiment of the present application.

A first terminal of the energy gateway 10 is coupled to the energy storage system 20, a second terminal of the energy gateway 10 is coupled to the power conversion system 30, and the power sources 40 are coupled to the energy gateway 10 through coupled a power conversion module 301. As shown in FIG. 5, the energy gateway 10 is coupled to a load 50, and the energy storage system 20 supplies power to the load 50.

When the energy storage system 20 needs to be charged, the power sources 40 are coupled to the energy gateway 10 to supply power to the energy storage system 20. When the main power source is disconnected, the energy storage system 20 supplies power to the load 50.

As an optional embodiment, the energy storage system 20 can be switched between a working mode of a voltage source and a working mode of a current source. When the energy storage system 20 is coupled to a photovoltaic power source 401, the photovoltaic power source 401 supplies power to the energy storage system 20, and the energy storage system 20 is switched to the working mode of the current source.

In the embodiment of the present application, the energy gateway is configured to control the coupling and decoupling of the different power sources 40, the energy storage system 20 is coupled to the energy gateway 10 and configured to store the electrical energy, the power conversion system 30 is coupled to the energy gateway 10 and configured to convert the different power sources 40 into the current sources or voltage sources, the power conversion system 30 includes multiple power conversion modules 301, each power conversion module 301 is coupled to one power source 40, the power conversion modules 301 are configured to convert the different power sources 40 into the current sources and voltage sources and configured to couple the multiple power sources 40 to the energy storage system 20 so that when different types of power sources 40 are coupled to the energy gateway 10, the multiple power sources 40 can work together to supply power to an energy storage system, thereby improving the coupling effect of the power sources 40 of the household energy storage system and improving the effect of using the household energy storage system.

Figure 2:
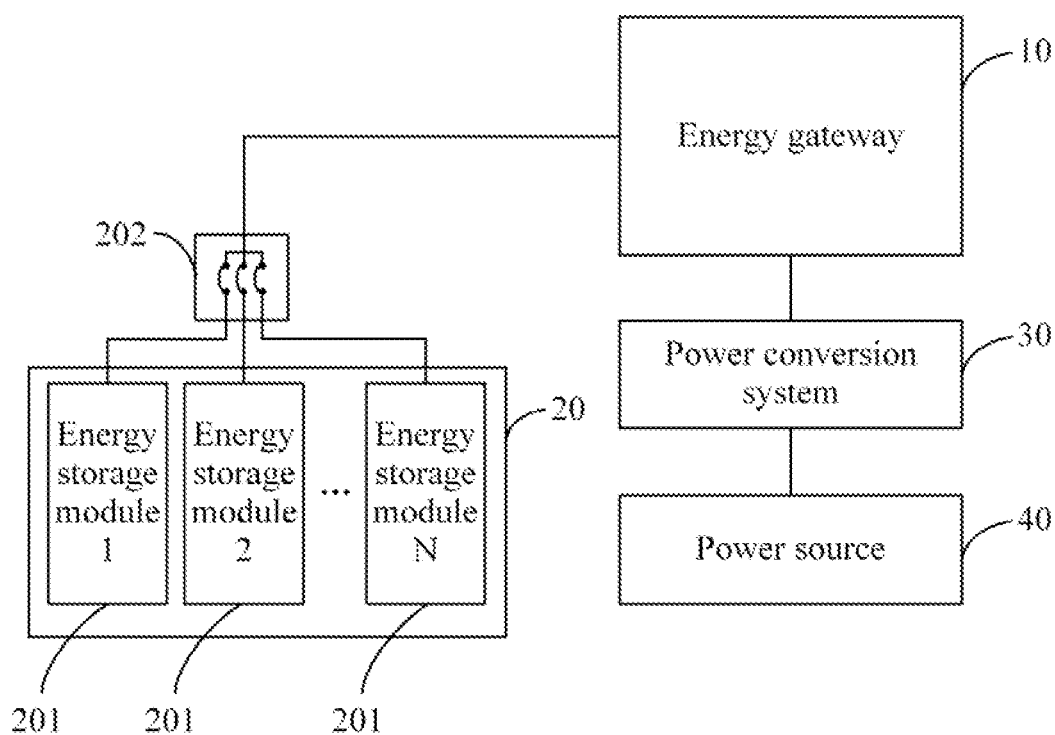
FIG. 2 is a schematic diagram of a multi-source coupling system for household energy storage in another embodiment of the present application.

As shown in FIG. 2, the energy storage system 20 includes at least one energy storage module 201, where each energy storage module 201 is configured to store the electrical energy.

As shown in FIG. 2, the energy storage system 20 further includes a combiner box 202 configured to combine the electric power of multiple energy storage modules 201.

The energy storage system 20 includes at least one energy storage module 201, and each energy storage module 201 is used as an energy storage unit to store the electrical energy. When two or more energy storage modules 201 are provided, the energy storage modules 201 are coupled in series or parallel. The number of energy storage modules 201 can be increased or decreased according to the use scenarios of the household energy storage system, thereby increasing the use scenarios and improving the use flexibility of the household energy storage system.

The energy storage system 20 is coupled to the energy gateway 10 through the combiner box 202, and the combiner box 202 is configured to combine the electric power of the multiple energy storage modules 201.

In this embodiment, the multiple energy storage modules 201 form the energy storage system 20, the combiner box 202 combines the electric power of the multiple energy storage modules 201, and the number of energy storage modules 201 can be increased or decreased according to actual applications, thereby improving the breadth of application scenarios.

Figure 3:
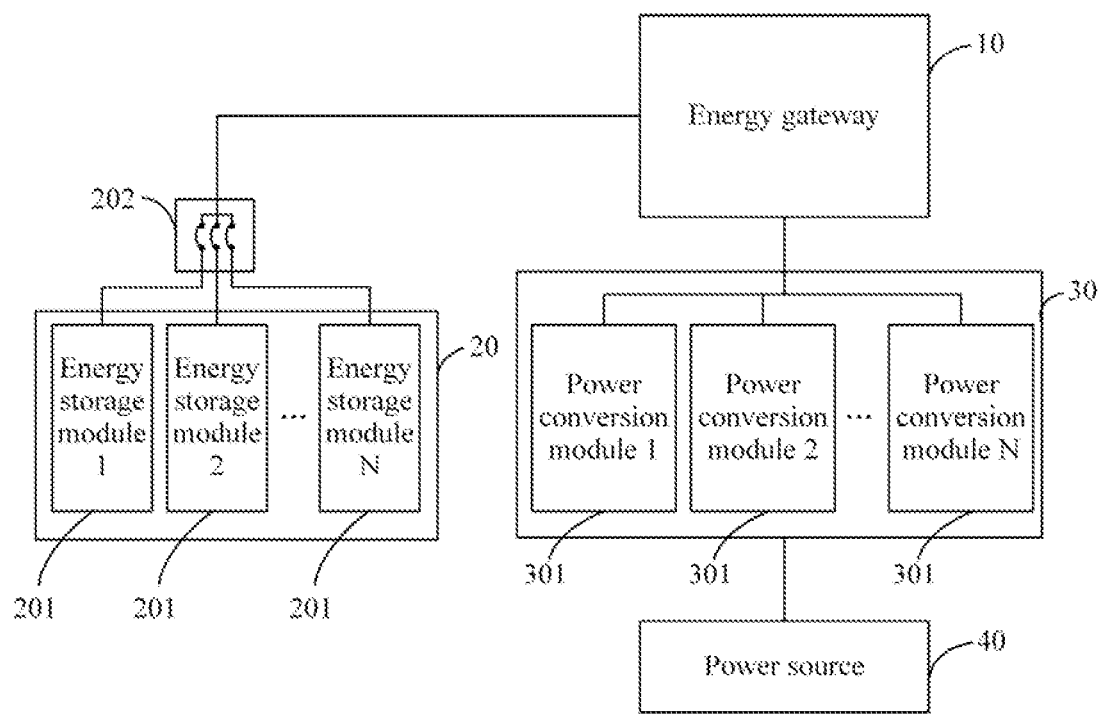
FIG. 3 is a schematic diagram of a multi-source coupling system for household energy storage in another embodiment of the present application.

As shown in FIG. 3, the power conversion system 30 includes multiple power conversion modules 301, where each power conversion module 301 is coupled to one power source 40.

The power conversion module 301 is a DC-AC conversion module or an AC-AC conversion module.

The power conversion system 30 includes at least one power conversion module 301, where each power conversion module 301 is coupled to one power source 40. According to actual usage requirements, the number of power sources to be coupled may be increased or decreased, and at the same time, the number of power conversion modules 301 to be coupled may be increased or decreased.

According to different types of power sources 40, the power conversion modules 301 are divided into the DC-AC conversion module or the AC-AC conversion module. When the power source 40 is a voltage source, the voltage source is coupled to the AC-AC conversion module. When the power source 40 is a DC power source, the DC power source is coupled to the DC-AC conversion module.

In this embodiment, multiple power conversion modules 301 are provided, the number of power sources 40 can be flexibly increased, and the power conversion modules 301 switch the working modes of the power sources 40 so that the multiple power sources 40 can be coupled to the multi-source coupling system for household energy storage, thereby improving the convenience of coupling the power sources 40 to the energy storage system 20.

The power conversion modules 301 have a phase-locking function.

The power conversion modules 301 have the phase-locking function and can provide the phase-locking function for the coupled power sources 40, thereby enabling the coupled multiple power sources 40 to maintain the same phase to properly supply power to the energy storage system 20 and ensuring that the power sources 40 are not damaged.

Figure 4:
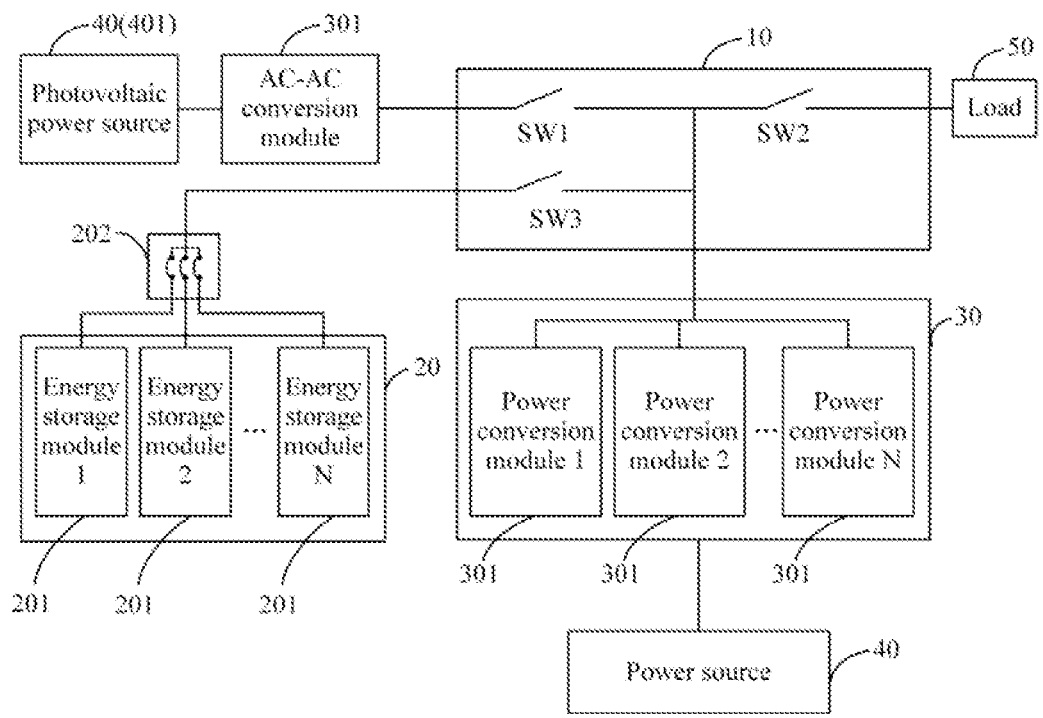
FIG. 4 is a schematic diagram of a multi-source coupling system for household energy storage in another embodiment of the present application.

As shown in FIG. 4, the energy gateway 10 includes a first switch SW1, a second switch SW2, and a third switch SW3, where the first switch SW1 is coupled to the second switch SW2, the third switch SW3 is coupled between the first switch SW1 and the second switch SW2, the first switch SW1 is configured to be coupled to the power conversion system 30 and the photovoltaic power source 401, the second switch SW2 is configured to be coupled to the power conversion system 30 and the load 50, and the third switch SW3 is configured to be coupled to the energy storage system 20.

In this embodiment, the first switch SW1 is configured to be coupled to the power conversion system 30 and the photovoltaic power source 401, and the photovoltaic power source 401 is coupled to the energy gateway 10 through the power conversion module 301, where the power conversion module 301 is the AC-AC conversion modules.

The second switch SW2 is configured to be coupled to the power conversion system 30 and the load 50, the third switch SW3 is disposed between the first switch SW1 and the second switch SW2, and the third switch SW3 is coupled to the energy storage system 20.

When the first switch SW1 and the third switch SW3 are turned on and the second switch SW2 is turned off, the photovoltaic power source 401 charges the energy storage system 20. When the first switch SW1 is turned off and the second switch SW2 and the third switch SW3 are turned on, the energy storage system 20 supplies power to the load 50.

In this embodiment, the first switch SW1, the second switch SW2, and the third switch SW3 are provided to control the charging process and the power supply process of the energy storage system 20, thereby improving the convenience of using the household energy storage system.

As shown in FIG. 5, the energy gateway 10 further includes a fourth switch SW4 coupled between the first switch SW1 and the second switch SW2 and configured to be coupled to the power conversion system 30 and a generator 402.

The fourth switch SW4 is coupled to the first switch SW1, the second switch SW2, and the third switch SW3, and the generator 402 is used as a power source and coupled to the power conversion system 30 and the energy gateway 10. The energy gateway 10 is coupled to the power conversion module 301 through the fourth switch SW4, and the power conversion module 301 is coupled to the generator 402.

The power conversion module 301 is the AC-AC conversion module, the generator 402 is the voltage source, and the AC-AC conversion module provides the phase-locking function for the generator 402.

In this embodiment, the fourth switch SW4 is provided for the generator 402, the generator 402 is coupled to the energy gateway 10 through the AC-AC conversion module, and the coupling and decoupling of the generator 402 are controlled by the fourth switch SW4, enabling the convenience of coupling the power source.

As shown in FIG. 5, the energy gateway 10 further includes a fifth switch SW5 coupled between the first switch SW1 and the second switch SW2 and configured to be coupled to the power conversion system 30 and a car power outlet 403.

The fifth switch SW5 is coupled to the first switch SW1, the second switch SW2, and the third switch SW3 and connected in parallel with the fourth switch SW4, and the car power outlet 403 is used as a power source and coupled to the power conversion system 30 and the energy gateway 10. The energy gateway 10 is coupled to the power conversion module 301 through the fifth switch SW5, and the power conversion module 301 is coupled to the car power outlet 403.

The power conversion module 301 is the AC-AC conversion module, the car power outlet 403 is the voltage source, and the AC-AC conversion module provides the phase-locking function for the car power outlet 403.

In this embodiment, the fifth switch SW5 is provided for the car power outlet 403, the car power outlet 403 is coupled to the energy gateway 10 through the AC-AC conversion module, and the coupling and on-off of the car power outlet 403 are controlled by the fifth switch SW5, enabling the convenience of coupling the power source 40.

As shown in FIG. 5, the energy gateway 10 further includes a sixth switch SW6 coupled between the first switch SW1 and the second switch SW2 and configured to be coupled to the power conversion system 30 and a fuel cell 404.

The sixth switch SW6 is coupled to the first switch SW1, the second switch SW2, and the third switch SW3 and connected in parallel with the fourth switch SW4 and the fifth switch SW5, and the fuel cell 404 is used as the power source 40 and coupled to the power conversion system and the energy gateway 10. The energy gateway 10 is coupled to the power conversion module 301 through the sixth switch SW6, and the power conversion module 301 is coupled to the fuel cell 404.

The power conversion module 301 is the DC-AC conversion module, the fuel cell 404 is the DC power source, and the DC-AC conversion module converts DC power into AC power.

In this embodiment, the sixth switch SW6 is provided for the fuel cell 404, the fuel cell 404 is coupled to the energy gateway 10 through the DC-AC conversion module, and the coupling and decoupling of the fuel cell 404 are controlled by the sixth switch SW6, enabling the convenience of coupling the power source 40.

For the convenience and simplicity of the description, the division of multiple preceding functional units and modules is used as an example. In practice, the preceding functions may be assigned to different functional units and modules as needed, that is, the internal structure of the device is divided into different functional units or modules so as to implement all or part of the functions described above.

What is claimed is:

1. A multi-source coupling system for household energy storage, comprising:
   an energy gateway configured to control coupling and decoupling of each of different power sources, the different power sources including a photovoltaic power source, a generator, a vehicle power outlet, and a fuel cell;
   an energy storage system coupled to the energy gateway and configured to store electrical energy; and
   a power conversion system coupled to the energy gateway and configured to convert the different power sources into current sources or voltage sources,
   wherein:
   the power conversion system comprises a plurality of power conversion modules,
   the plurality of power conversion modules have a phase-locking function arranged to maintain a same phase between at least two of the generator, the vehicle power outlet, or the fuel cell among the different power sources,
   the energy gateway comprises a first switch and a second switch,
   the first switch is configured to be coupled to the power conversion system and the photovoltaic power source, and the second switch is configured to be coupled to the power conversion system and a load.

2. The system of claim 1, wherein the energy storage system comprises at least one energy storage module configured to store the electrical energy.

3. The system of claim 2, wherein the energy storage system comprises a plurality of energy storage modules and further comprises a combiner box, wherein the combiner box is configured to combine electric energy of the plurality of energy storage modules.

4. The system of claim 1, wherein each power conversion module of the plurality of power conversion modules is configured to be coupled to one power source of the different power sources.

5. The system of claim 1, wherein any power conversion module of the plurality of power conversion modules is a direct current-alternating current (DC-AC) conversion module or an alternating current-alternating current (AC-AC) conversion module.

6. The system of claim 1, wherein each power conversion module of the plurality of power conversion modules has the phase-locking function.

7. The system of claim 1, wherein the energy gateway further comprises a third switch, wherein:
the first switch is coupled to the second switch, the third switch is coupled between the first switch and the second switch, and
the third switch is configured to be coupled to the energy storage system.

8. The system of claim 7, wherein the energy gateway further comprises a fourth switch coupled between the first switch and the second switch and configured to be coupled to the power conversion system and a generator.

9. The system of claim 7, wherein the energy gateway further comprises a fifth switch coupled between the first switch and the second switch and configured to be coupled to the power conversion system and a car power outlet.

10. The system of claim 7, wherein the energy gateway further comprises a sixth switch coupled between the first switch and the second switch and configured to be coupled to the power conversion system and a fuel cell.

11. The system of claim 2, wherein the energy gateway further comprises a third switch, wherein:
the first switch is coupled to the second switch, the third switch is coupled between the first switch and the second switch, and
the third switch is configured to be coupled to the energy storage system.

12. The system of claim 11, wherein the energy gateway further comprises a fourth switch coupled between the first switch and the second switch and configured to be coupled to the power conversion system and a generator.

13. The system of claim 11, wherein the energy gateway further comprises a fifth switch coupled between the first switch and the second switch and configured to be coupled to the power conversion system and a car power outlet.

14. The system of claim 11, wherein the energy gateway further comprises a sixth switch coupled between the first switch and the second switch and configured to be coupled to the power conversion system and a fuel cell.

15. The system of claim 3, wherein the energy gateway comprises a third switch, wherein:
the first switch is coupled to the second switch, the third switch is coupled between the first switch and the second switch, and
the third switch is configured to be coupled to the energy storage system.

16. The system of claim 15, wherein the energy gateway further comprises a fourth switch coupled between the first switch and the second switch and configured to be coupled to the power conversion system and a generator.

17. The system of claim 15, wherein the energy gateway further comprises a fifth switch coupled between the first switch and the second switch and configured to be coupled to the power conversion system and a car power outlet.

18. The system of claim 15, wherein the energy gateway further comprises a sixth switch coupled between the first switch and the second switch and configured to be coupled to the power conversion system and a fuel cell.

19. The system of claim 3, wherein the energy gateway further comprises a third switch, wherein:
the first switch is coupled to the second switch, the third switch is coupled between the first switch and the second switch, and
the third switch is configured to be coupled to the energy storage system.

20. The system of claim 19, wherein the energy gateway further comprises a fourth switch coupled between the first switch and the second switch and configured to be coupled to the power conversion system and a generator.

* * * * *